United States Patent [19]

Truong

[11] Patent Number: 4,984,241
[45] Date of Patent: Jan. 8, 1991

[54] TIGHTLY SYNCHRONIZED FAULT TOLERANT CLOCK

[75] Inventor: Tuong K. Truong, Renton, Wash.

[73] Assignee: The Boeing Company, Seattle, Wash.

[21] Appl. No.: 301,327

[22] Filed: Jan. 23, 1989

[51] Int. Cl.$^5$ .............................................. G06F 11/18
[52] U.S. Cl. ....................................... 371/36; 371/61; 307/464
[58] Field of Search ..................... 371/61, 36; 307/464, 307/219; 328/63, 108; 364/200, 900

[56] References Cited

U.S. PATENT DOCUMENTS

| | | | |
|---|---|---|---|
| 3,278,852 | 10/1966 | Mann ..................................... | 328/60 |
| 3,522,455 | 8/1970 | Thomas ............................ | 307/219 X |
| 3,599,111 | 8/1971 | Butler, Jr. .............................. | 331/55 |
| 3,769,607 | 10/1973 | Thelen ...................................... | 331/2 |
| 3,900,741 | 8/1975 | Fletcher et al. ..................... | 307/204 |
| 4,038,608 | 7/1977 | Bard .................................. | 307/219 X |
| 4,164,629 | 8/1979 | Ollivier ............................ | 307/219 X |
| 4,239,982 | 12/1980 | Smith ..................................... | 307/219 |
| 4,683,570 | 7/1987 | Bedard ............................. | 371/61 X |
| 4,788,670 | 11/1988 | Hofmann .......................... | 371/36 X |
| 4,839,855 | 6/1989 | Van Driel ......................... | 371/61 X |

*Primary Examiner*—Jerry Smith
*Assistant Examiner*—Robert W. Beausoliel
*Attorney, Agent, or Firm*—Dellett, Smith-Hill & Bedell

[57] ABSTRACT

A tightly synchronized fault tolerant clock has n+1 substantially identical modules for synchronizing the clock signals of the modules and masking out faults in up to n modules. Each module has an oscillator comprising an amplifier and a regenerative feedback path. The feedback path includes a resonator for determining the oscillation frequency, a variable trimming capacitor for establishing synchronization among the oscillators in the individual modules, an isolation buffer network to eliminate single point failure and to establish a fault containment region, and a majority voter network for maintaining tight synchronization among the oscillators and masking out faults in the individual modules.

16 Claims, 3 Drawing Sheets

TIGHTLY SYNCHRONIZED FAULT TOLERANT CLOCK

BACKGROUND OF THE INVENTION

This invention relates to a tightly synchronized fault tolerant clock.

It is desirable that airborne electronic (avionic) equipment should have a very high level of reliability. This may be achieved by use of fault tolerant architecture. One technique for achieving fault tolerance is redundancy. Redundancy at component level, i.e. interdependent multiple clock channels within a circuit, rather than at system level is needed to obtain the required reliability. In a fault tolerant computing system that comprises multiple processors operating in lockstep and uses redundant clocks, the clocks must be synchronized in order for the computing system to be able to effectively compare data and mask out faults. A fault tolerant clock must be extremely reliable to meet the reliability requirement for its host fault tolerant computer. To maintain the synchronization and reliability of the clock it is important that the design be simple and require a minimal number of components.

Typically, to tolerate a single fault, a fault tolerant clock has three or more clock channels each comprising an oscillator having a feedback path that contains a majority voter. The majority voter receives the outputs of all channels and provides a clock output signal that reflects the state of the majority of the channel outputs. A particular troublesome failure in a fault tolerant clock of this type is the malicious or byzantine fault which occurs when one channel is faulty in such a way that it broadcasts different signals to or is perceived differently by the other channels thus causing inconsistency in voter outputs. In a loosely synchronized system, a substantial amount of additional circuitry is needed to eliminate this special fault. One method is quadrature mode redundancy, employing four channels with outputs from three channels feeding back to the voter of the fourth channel. This increase in circuitry and complexity can reduce the overall reliability of the system.

In general, the prior art in fault tolerant clocking systems exhibits the properties of being loosely synchronized to approximately 25 to 50% of the clock period and only operational at frequencies that are currently considered relatively low, e.g. less than 10 MHz. Such systems also utilize extensive hardware and in some cases involve software. The system taught in U.S. Pat. No. 4,644,498 employs a triple modular redundant architecture. Each channel of this system utilizes a majority voter network in the feed-back loop to establish and maintain the synchronization of the oscillator. As with most systems employing a majority voter network to both establish and maintain synchronism, the result is a loosely synchronized system. As a result of this loose synchronization, the system will have erroneous outputs for certain fault inputs, i.e. duty cycle changes or glitches. Also, a bridging fault to two or more inputs of any voter will fail the whole system. The operating frequency of this system is only 5 MHz.

In U.S. Pat. No. 4,239,982 a fault tolerant clocking system is taught that requires $2M+2$ channels to tolerate faults in M channels. This system also employs complex phase locking circuitry, which leads to low reliability.

U.S. Pat. No. 3,769,607 shows a switched oscillator clock pulse generator. This system uses an extensive amount of hardware in its master selector circuit for determining the master oscillator. A substantial amount of hardware in the error circuitry lies between the oscillator and output pulse. This downstream circuitry reduces the synchronization between the individual channels. This system also utilizes a microprocessor for adjusting the algorithm that controls the error indicators in the flip flops and for selecting the master oscillator. A single point failure may occur when the master clock itself is in error.

U.S. Pat. 3,278,852 shows a redundant clock pulse source utilizing an architecture in which switching and decision making elements are alternated. This architecture also relies on a majority voter to establish and maintain synchronization. This results in loop synchronization which may cause errors for some inputs. For example, if any two inputs of any decision element are shorted together, all outputs will be faulty. This is an example of a single point failure. This system cannot tolerate a malicious fault.

U.S. Pat. 3,599,111 shows a system comprising three oscillator circuits driven by a common sync-pulse generating oscillator. Although a backup oscillator is provided, this single oscillator provides a common point failure. In addition, when the first oscillator fails, a transient due to the switching from the oscillator to the back-up oscillator occurs. There is no feedback to the crystal oscillator and synchronization is provided by a majority voter network resulting in loose synchronization.

U.S. Pat. 3,900,741 teaches a fault tolerant clock apparatus utilizing a controlled minority of clock elements. This system requires $3M+1$ channels to tolerate M faults. No phase locking circuitry exists, therefore limiting the system to use at relatively low frequencies. A complicated quorum logic network is used instead of a simple majority voter network.

The current state of technology in fault tolerant clocking is a system that utilizes extensive hardware, only provides loose synchronization, is not effectively operable at high frequencies and does not tolerate multiple failures within a single chip, considered herein as a single point failure. The component count and especially the number of components "downstream" from the output of the oscillator is very important in maintaining tight synchronization between the three channels. When dependent on a majority voter for synchronization, such a system provides only loose synchronization, which renders the system sensitive to glitches and malicious faults. Such a conventional system also does not tolerate multi-pin failures within a single channel, e.g. if all of the inputs to a voter were shorted to ground.

SUMMARY OF THE INVENTION

According to the present invention there is provided a tightly synchronized fault tolerant clock, comprising $2n+1$ substantially identical modules for synchronizing the clock signals of the modules and masking out faults in up to n modules. Each module has an oscillator comprising an amplifier and a regenerative feedback path which includes a resonator for determining the oscillation frequency, a variable trimming capacitor for establishing synchronization among the oscillators in the individual modules and a majority voter network for maintaining tight synchronization among the oscillators and masking out faults in the individual modules.

Accordingly, it is an object of the present invention to provide a tightly synchronized fault tolerant clock having 2n+1 modules wherein the modules are synchronized to within 10% of the period of the clock signal.

It is another object of the present invention to provide a tightly synchronized fault tolerant clock having 2n+1 modules which will tolerate all single channel failures and some multi-channel failures.

It is another object of the present invention to provide a tightly synchronized fault tolerant clock having 2n+1 modules with a relatively low number of components thereby improving the reliability and synchronization of the clock.

It is yet another object of the present invention to provide a tightly synchronized fault tolerant clock having 2n+1 channels with an operating frequency up to 60 MHz.

It is a further object of the present invention to provide a tightly synchronized fault tolerant clock having 2n+1 modules wherein a failure in an individual module will be contained to that module.

BRIEF DESCRIPTION OF THE DRAWINGS

For a better understanding of the invention, and to show how the same may be carried into effect, reference will now be made, by of example, to the accompanying drawings in which.

DETAILED DESCRIPTION OF THE DRAWINGS

Figure 1:
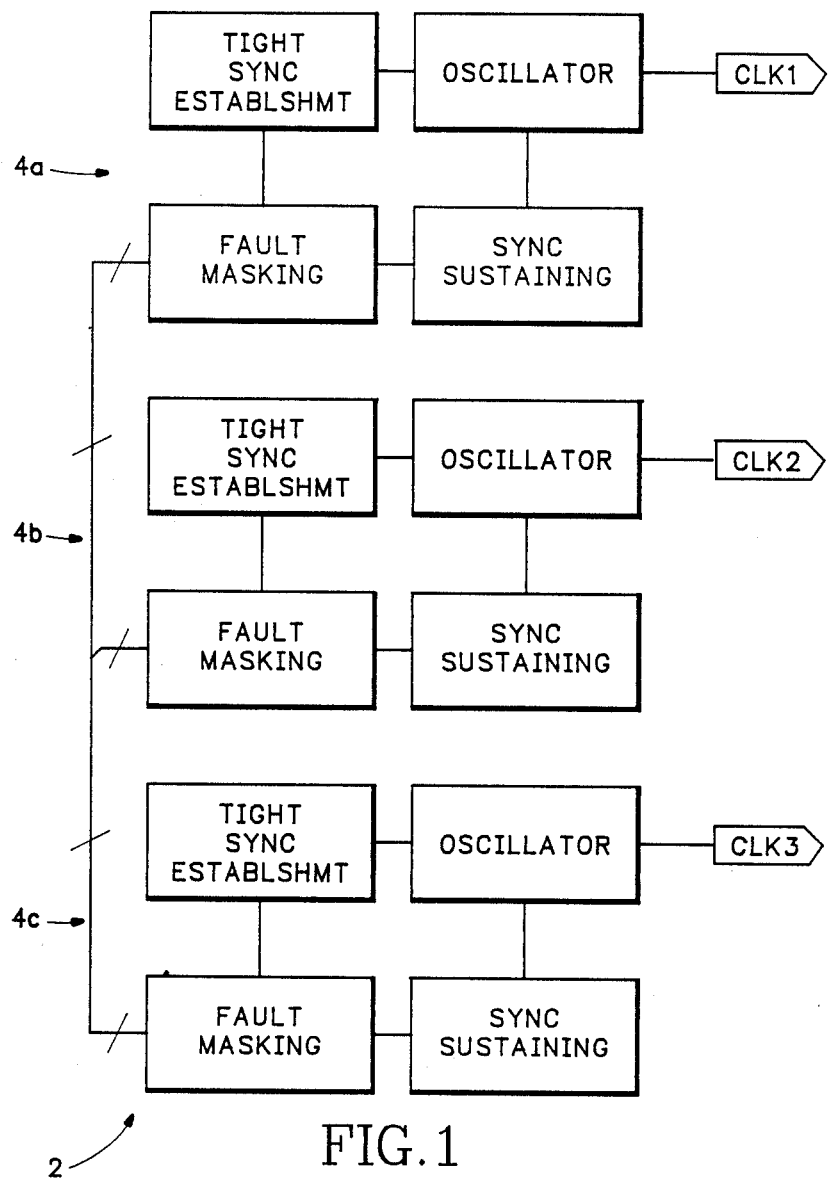
FIG. 1 is a functional block diagram of a tightly synchronized fault tolerant clock embodying the present invention.
Figure 2:
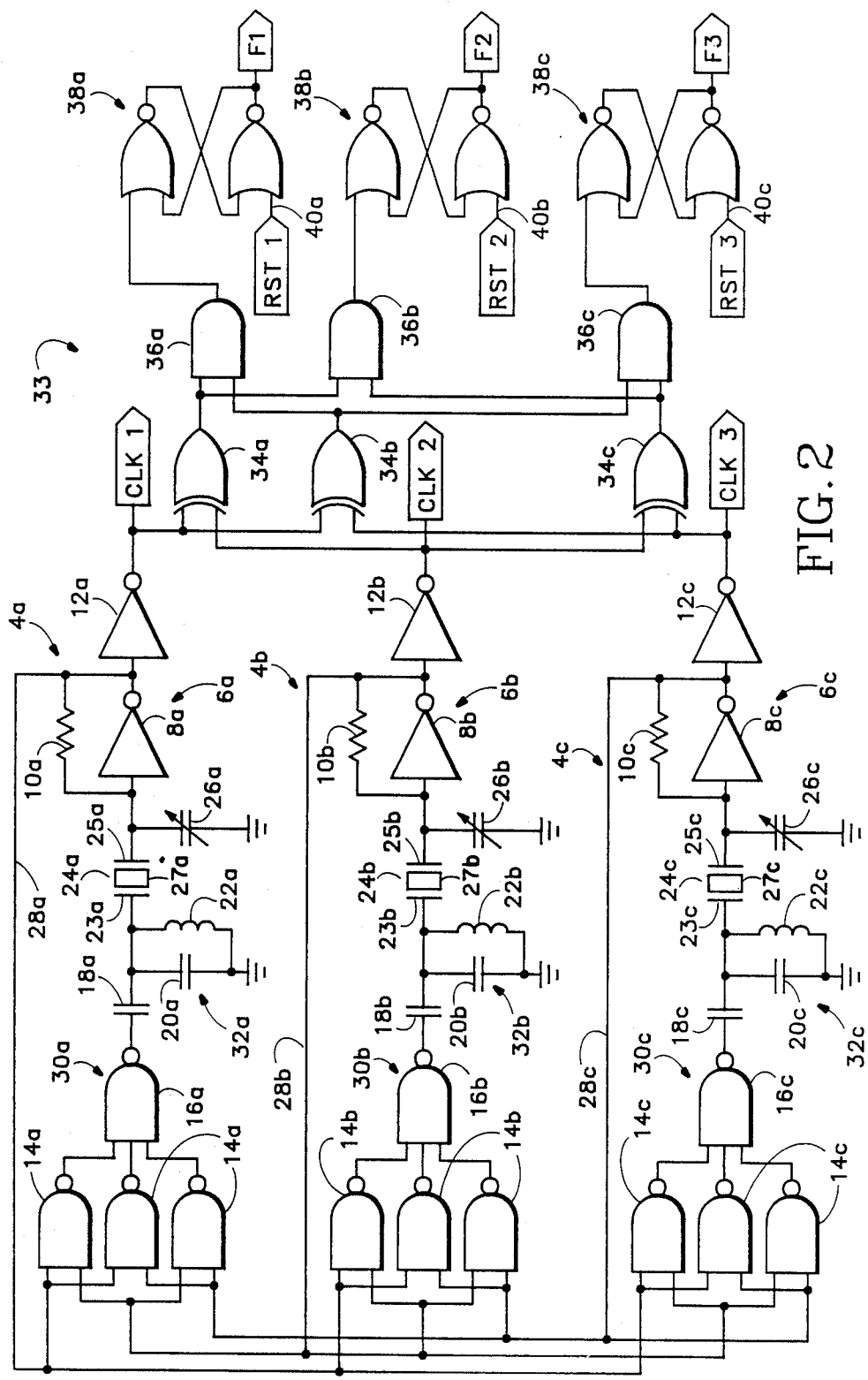
FIG. 2 illustrates the three identical modules of the tightly synchronized fault tolerant clock and a fault identification circuit.

FIG. 1 is a functional block diagram of a tightly synchronized fault tolerant clock embodying the invention. The tightly synchronized fault tolerant clock 2 has three identical modules 4a, 4b and 4c each module 4 comprising an oscillator and mechanisms for establishing tight synchronization between the oscillators in each of the modules, masking out faults and maintaining tight synchronization. The schematic diagram illustrated in FIG. 2 represents an embodiment of the clock. As shown in FIG. 2, each module 4 comprises a linear amplifier 6 and a regenerative feedback path 28. The regenerative feedback path 28 includes a variable capacitor 26, a majority voter network 30, an isolation capacitor 18, an LC tank 32 and a resonator 24. Resonator 24 comprises a quartz crystal 27, which is provided with electrodes 23 and 25.

The linear amplifier 6 consists of an inverter 8 connected in parallel with a biasing resistor 10. The output of linear amplifier 6 is connected to the input of an output inverter 12 and is also connected to the input of each of the three identical modules. The majority voter network 30 is arranged to receive the respective combinations of the outputs from the three identical modules 4. The isolation capacitor 18 is connected between the output of the majority voter network 30 and the electrode 23. The LC tank 32 is connected between ground and the electrode 23 and comprises the parallel combination of a capacitor 20 and an inductor 22. The electrode 25 is connected to the input of linear amplifier 6.

The variable capacitor 26 is connected between the input of linear amplifier 6 and ground. The components in the three identical modules 4a, 4b and 4c are numbered accordingly and the suffices a, b and c are used to identify the components of a particular module.

Inverter 8 is biased to operate as a linear amplifier 6 to enable oscillation to build up. Once started, the inverter is in saturation mode and loop gain greater than 1, i.e. regenerative feedback, is obtained only during the linear switching interval. During the saturation interval, there is no gain and oscillation is sustained by the crystal's energy alone. Preferably, the inverter 8 is an advanced CMOS inverter which comprises a complementary pair of p-channel and n-channel MOS/FET's and is biased midway between Vcc and ground with a single resistor connecting the gate and drain terminals, feeding DC output back to the input.

The biasing resistor 10 is large enough not to load down the low impedance crystal feedback path and yet is small compared to the input impedance of inverter 8, which is in the order of $10^{12}$ ohms. The amplifier 6 provides a nominal 180° phase shift and enough gain to offset the loss in the feedback path. The feedback loop provides an additional 180° of phase shift and controls all frequency characteristics of the module 4.

The quartz crystal 27 is AT cut, i.e. a 35 degree cut angle off the crystal's y axis. An AT cut crystal is characterized by excellent electromechanical performance and very good temperature stability and shock resistance. The crystal is calibrated to work in a parallel resonant circuit with a load capacitance provided by capacitor 20 and variable capacitor 26. The frequency determining factor for this type of crystal is its thickness, since it vibrates in the thickness shear mode. A typical low cost 12 MHz crystal operating in the third overtone (36 MHz) has a frequency tolerance of 30 parts per million at room temperature, an aging rate of about 5 parts per million per year and frequency stability of 30 parts per million over the range from −20° C. to +70° C. Such a crystal has very low series resistance, less than 30 ohms, and shunt capacitance less than 6 pF, and has a drive level of 1 mw resulting in extremely high Q (quality factor) and a very sharp phase and frequency response around the resonant frequency. The crystal's Q is a function of its motional resistance and reactance at the operating frequency, and is typically in the hundred thousand range for AT cut crystal. The in-circuit Q of the crystal is preserved since the input impedance of the CMOS amplifier is mostly capacitive and therefore nearly lossless.

Figure 4:
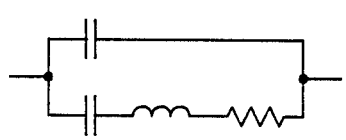
FIG. 4 illustrates an equivalent circuit of a crystal.

Resonator 24 can be modeled (FIG. 4) by an equivalent circuit of discrete parts comprising a parallel resonant circuit having in one branch the series combination of a capacitor, an inductor and a resistor representing the quartz element and in its other branch a capacitor representing the packaging capacitance of the crystal.

In the preferred mode of operation, crystal 27 in the parallel resonant circuit resonates at its third overtone in its inductive region between the resonant and antiresonant frequencies within which its phase varies by a large range with very small changes in frequency. Therefore, at the operating frequency, resonator 24 appears to be an inductive element. A very small frequency shift is necessary to change the crystal's impedance to compensate for phase errors around the feedback path. Therefore, the crystal will operate at a driving frequency which is shifted from the third overtone by an amount sufficient to compensate for the phase errors in the feedback path. The crystal in this mode acts like an inductor which resonates with the external load capacitors.

The variable capacitor 26 is a manually adjustable capacitor and is used to establish tight synchronization between the oscillators of the three modules 4. After initial adjustment of variable capacitor 26 to establish the tight synchronization, it remains unchanged.

The LC tank 32 forms a resonant circuit just below the operating frequency of the oscillator to suppress the fundamental frequency of the crystal. The LC tank is tuned to a frequency between the desired operating frequency and the next lower odd harmonic so that at the desired frequency, the tank appears capacitive (the impedance of the inductor (L) is much greater than the impedance of the capacitor (C)) and provides a phase lag necessary for oscillation (180° in the amplifier and 180° in the feedback path). At lower harmonics, the tank appears inductive (impedance of C is much greater than the impedance of L) and does not provide the phase shift necessary for oscillation.

The capacitor 20 and the variable capacitor 26 together with the amplifier's pin-to-pin and pin-to-ground capacitances make up the crystal's aforementioned load capacitance. These capacitors parallel the internal capacitance of the amplifier, which is only about 7 pF, thus reducing the effect of variation from amplifier to amplifier. Larger values of capacitor 20 and variable capacitor 26 will increase the frequency stability but at the same time will reduce loop gain and increase start up time.

The majority voter network 30 comprises three, two input NAND gates 14 and one, three input NAND gate 16. The NAND gates 14 are arranged to receive the respective combinations of the outputs from the three identical modules 4. The outputs of the NAND gates 14 form the inputs to the three input NAND gate 16. The logic of the majority voter is that the output will follow the majority of the three inputs, and therefore any faulty input will be outvoted by the other two and changed to be in agreement with the other two. In this manner, a faulty module is masked out and does not affect the operation of the other two modules or the overall performance of the fault tolerant clock. A divider network comprising capacitors 18 and 20 sets the voltage driving the crystal. Capacitor 18 also provides DC isolation of the crystal from the output of the voter.

FIG. 2 also illustrates a fault identification circuit 33, which serves to identify a faulty module when the fault tolerant clock has reached steady state operation. The circuit 33 comprises three EXOR gates 34 arranged to receive the respective combinations of the outputs of the three identical modules 4 and three two input AND gates 36 arranged to receive the respective combinations of the outputs from the three EXOR gates. The logic of the circuit 33 is such that a faulty module will be represented by a 1 at the output of its respective AND gate 36. The circuit 33 further comprises three output latches 38, one for each channel. Each output latch 33 receives as inputs the output of the respective AND gate 36 and a fault reset input 40. When the fault reset input is set at a logic level 0, indicating steady state conditions in the fault tolerant clock, the latch is enabled and the value at the output of the AND gate will propagate through the latch to an output flag at the output of the latch. Each latch 38 comprises a standard connection of two input NOR gates 12. Oscillation start up time and full synchronization are achieved within about one second.

Figure 3:
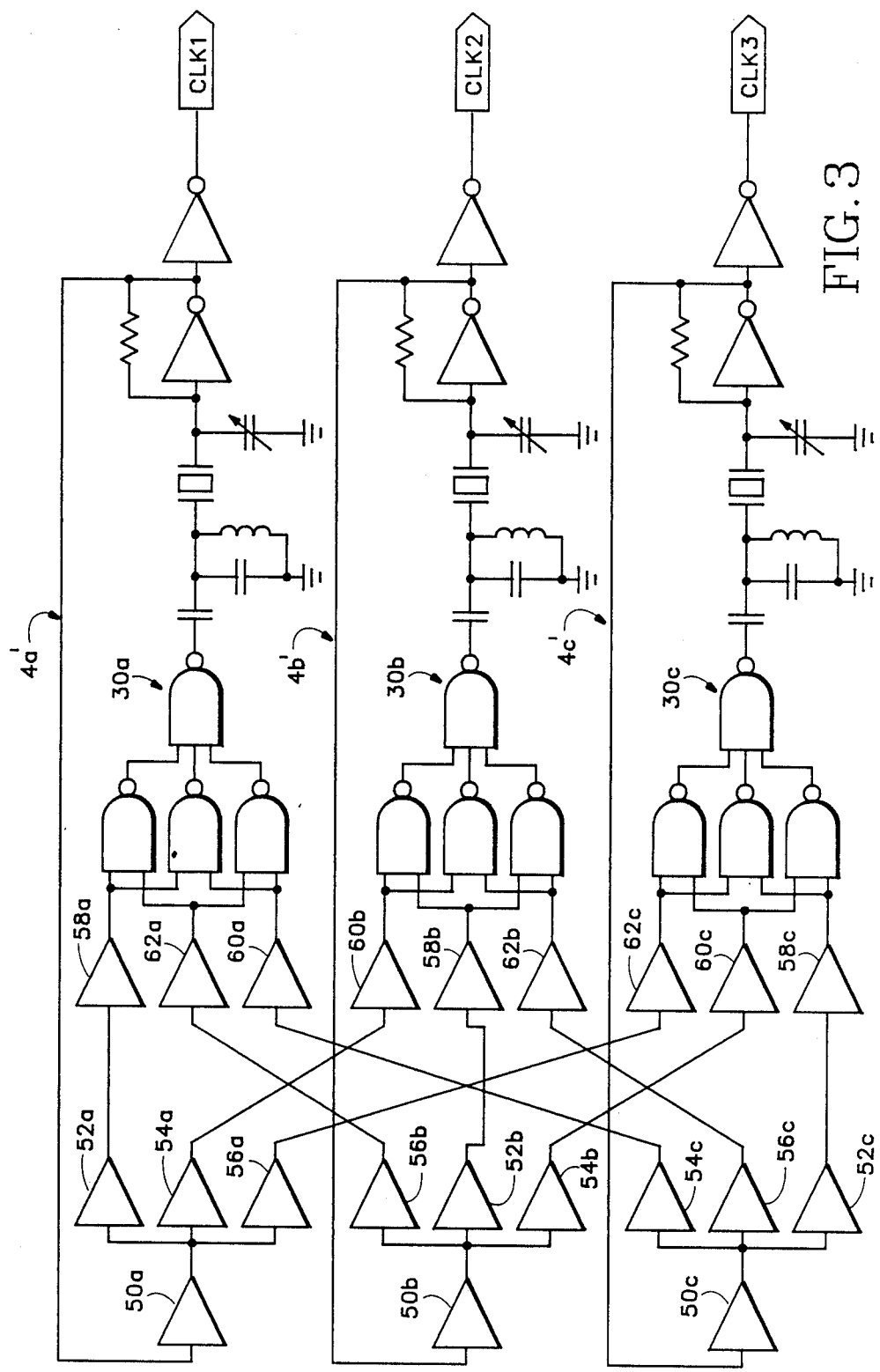
FIG. 3 illustrates the isolation buffers.

As seen in FIG. 2, a short between two of the inputs to the majority voter network 30 would immediately propagate to the other two modules and cause the clock to fail. FIG. 3 illustrates an isolation buffer comprising twenty-one non-inverting gates connected in the feedback path between the outputs of the modules and the inputs to the majority voter networks 30. The non-inverting gates are arranged with one gate 50 connected directly to the output of each of the modules. Each gate 50 drives three more gates 52, 54 and 56 in its own module. The outputs of these three gates are connected to three more gates 58, 60 and 62, one in each module. These single gates in each module are directly connected to the inputs of the majority voter network 30. The buffer provides an effective scheme for isolating multiple pin errors that may occur in the inputs of the NAND gates or in the inputs of the buffers themselves. A single or multiple pin failure in any module will not propagate through the buffers to affect any of the other modules.

A prototype of the fault tolerant clock utilizes two chips for each module of the clock. One chip comprises the inverter 8a of linear amplifier 6 and inverter 12a. The other chip contains the isolation buffers, the majority voter network and fault identification circuitry. Alternatively, all of these elements may be integrated onto a single ASIC chip for each module by a CMOS fabrication process. The biasing resistor 10 and the fixed capacitors 18 and 20 can also be integrated into the same chip. The variable capacitor 26 can be integrated in the same chip by implementing a parallel bank of capacitors arranged in a binary fashion, i.e. 1 pF, 2 pF, 4 pF, 8pF. By simply grounding the appropriate pins, trimming resolution of 1 pF can be achieved such that the oscillator is rendered immune to improper selection of external components and is even more reliable. At this level of integration, a multipin failure in a single module will not affect the other modules. This also makes it very easy to replace a defective module.

As seen in FIGS. 1, 2 and 3, the tightly synchronized fault tolerant clock employs a triple modular redundant architecture which enables an initial establishment of tight synchronization between the oscillators of the three identical modules and makes it possible to utilize a majority voter network 30 to mask out faults and maintain the tight synchronization established by the variable capacitor 26. As described hereinabove, the LC tank 32 effectively suppresses the fundamental frequency of the crystal 27 thereby allowing it to operate at an overtone frequency. This mode of operation can be defined as positive reactance oscillation. Positive reactance oscillation refers to the region on the transfer curve of the crystal plotting reactance verses frequency where the reactance is positive, i.e. inductive. The tight synchronization established by the variable capacitor 26 and maintained by the majority voter network 30 between the three modules was measured to be better than (less than) one nano-second at an operating frequency of 36 MHz. Therefore, the clock signals produced by the three modules are out of synchronization by less than 10% of the period at the operating frequency. A fault tolerant clock has been demonstrated to be tightly synchronized to within 10% at an operating frequency of 60 MHz.

The combination of tight synchronization, the majority voter network and an effective isolation buffer make up a clock that is highly impervious to single channel faults. The clock was tested under rigorous fault conditions and satisfactorily maintains synchronization within one nanosecond and frequency to well within 30 parts per million. To verify that the clock system can maintain tight synchronization in the two remaining channels when one channel fails, a testing simulation was performed. An open circuit condition was tested by removing a component and a short circuit condition was tested by removing a component and replacing it with a jumper wire. Single failure within modules was tested by shorting a pin to ground and tying a pin to Vcc. The signal was capacitively coupled with noise to examine the effects of coupling noise. The voltage supply was varied by ±5% from 5 volts and only small changes in clock amplitude and a few ppm changes in frequency were observed. A bad clock in a module was simulated by removing the fed back output to the voter and replacing it with a d.c. signal with variable amplitude from 0-5 v, an a.c. signal with frequency swept from d.c. to 80 MHz at different sweep rates, a random pulsed signal, high frequency bursts and signals at subharmonics and overtones of the clock frequency. Synchronization was maintained to within 1 ns and frequency to well within 30 ppm throughout the testing simulation.

In the described fault tolerant clock design, the inputs to the voter are initially synchronized by the variable capacitor and the majority voter networks are used to maintain this synchronization, therefore the inputs to this system are matched and the system will mask out a malicious or byzantine fault if it should occur, thus eliminating the need for any additional circuitry which would reduce the overall reliability and synchronism of the system. Additionally, if sliver pulses or glitches occur at the voter outputs they are filtered out by the crystals and are thus transparent to the oscillator outputs. The crystals in this case act as very high Q notch filters. The fault tolerant clock described herein is able to achieve tight synchronization because it initially establishes tight synchronization with the variable capacitor and maintains this tight synchronization with the majority voter network and accomplishes both of these highly desirable characteristics while employing a very small number of components. The reliability of the fault tolerant clock is further enhanced by implementing each module in its own chip. Based on Military Standard 217E Reliability Handbook, the clock achieves a reliability in excess of 99.8% for 100,000 hours of operation.

It will be appreciated that the invention is not restricted to the embodiments that have been described and illustrated, and that variations may be make therein without departing from the scope of the invention as defined in the appended claims, and equivalents thereof. For example, if the clock operates at the fundamental frequency of the crystal, inductor 22 can be omitted. Additionally, another type of resonator, such as a ceramic resonator or a discrete component resonator, could be used instead of the crystal 27 although the crystal is preferred because of its high frequency stability. Also, the inverter gate used as the linear amplifier may be replaced by a discrete transistor, or another oscillator architecture could be used. Furthermore, the fault tolerant clock described herein can be employed to provide a fault tolerant real time clock or a fault tolerant two-phase clock.

I claim:

1. A fault tolerant clock comprising:
    a plurality of substantially identical modules, each module having an output terminal and comprising:
        an oscillator having an amplifier with an input terminal, an output terminal and a feedback path,
        the feedback path comprising a majority voter network having a plurality of input terminals coupled to the output terminals of the modules respectively, and an output terminal,
    a variable trimming capacitor connected between the input terminal of said amplifier and a reference potential level, and
    a resonator connected between the output terminal of said majority voter network and the input terminal of said amplifier.

2. A fault tolerant clock as recited in claim 1, wherein each amplifier comprises an inverter and a biasing resistor connected in parallel between the input terminal of the amplifier and the output terminal thereof.

3. A fault tolerant clock as recited in claim 1, further comprising means for automatic fault detection coupled to said output terminal of each module to detect a faulty module and identify said faulty module.

4. A fault tolerant clock as recited in claim 3 having three modules, wherein said means for automatic fault detection comprises:
    three EXOR gates each having two inputs and one output, the inputs of the EXOR gates being electrically connected to receive different respective combinations of two output terminals from the three modules,
    three AND gates each having two inputs and one output, the inputs of the AND gates being electrically connected to receive different respective combinations of two outputs from the three EXOR gates, and
    three latches coupled to each receive the outputs of said AND gates respectively, and each having a fault reset input.

5. A fault tolerant clock as recited in claim 1, wherein said variable capacitor comprises a manually tunable capacitor.

6. A fault tolerant clock comprising:
    a plurality of substantially identical modules, each module having an output terminal and comprising:
        an oscillator having an amplifier with an input terminal, an output terminal and a feedback path,
        the feedback path including a majority voter network having a plurality of input terminals coupled to the output terminals of the modules respectively, and an output terminal coupled to the amplifier,
    a first capacitor connected between the input terminal of said amplifier and a reference potential level, said first capacitor being variable,
    a subcircuit having as its equivalent circuit at least a series combination of an inductor, a resistor and a second capacitor, said subcircuit being connected between the output terminal of the majority voter network and the input terminal of the amplifier, and
    frequency selective means that prevent oscillation at the resonant frequency of the subcircuit and allow oscillation at an overtone of said resonant frequency.

7. A fault tolerant clock as recited in claim 6, wherein the subcircuit comprises a piezoelectric crystal and first and second electrodes connected to the crystal, the first electrode being connected to the input terminal of said amplifier.

8. A fault tolerant clock as recited in claim 6, wherein the frequency selective means comprises an LC tank connected between the feedback path and a reference potential level.

9. A fault tolerant clock as recited in claim 8, wherein the LC tank comprises an inductor and a capacitor electrically connected in parallel.

10. A fault tolerant clock as recited in claim 8, further comprising a capacitor connected between said majority voter network and said subcircuit and wherein said LC tank includes a capacitor connected between the subcircuit and a reference potential level.

11. A fault tolerant clock as recited in claim 6, wherein the feedback path includes an isolation buffer between the output terminals of said modules and the input terminals of the majority voter networks.

12. A tightly synchronized fault tolerant clock comprising:
   2n+1 substantially identical modules where n is an integer, each module having an output terminal and comprising:
   a positive reactance oscillator comprising an amplifier with an input terminal, an output terminal, and a feedback path,
   the feedback path including:
      a capacitor electrically connected between said amplifier and a reference potential level,
      means for adjusting said capacitor to establish tight synchronization among the oscillators of the respective modules,
      a majority voter network coupled to the feedback paths of the other modules and having a plurality of gates for masking out faults in the modules, and
      a resonator connected between the output terminal of said majority voter network and the input terminal of said amplifier.

13. A fault tolerant clock as recited in claim 12, wherein the resonator comprises a piezoelectric crystal having a resonant frequency, and first and second electrodes connected to the crystal, the first electrode being connected to the input terminal of the amplifier and the second electrode being coupled to an output terminal of the majority voter network, and the feedback path further comprises frequency selective means connected between said second electrode and a reference potential level for preventing oscillation at the resonant frequency of the crystal and allowing oscillation at an overtone of said resonant frequency.

14. A fault tolerant clock comprising:
   a plurality of substantially identical modules, each module having an output terminal and comprising:
   an oscillator having an amplifier with an input terminal, an output terminal and a feedback path, the feedback path comprising:
   a majority voter network having a plurality of input terminals coupled to the output terminals of the modules respectively, and an output terminal,
   a variable trimming capacitor connected between the input terminal of said amplifier and a reference potential level,
   a resonator connected between the output terminal of said majority voter network and the input terminal of said amplifier, and
   an isolation buffer between the output terminals of said modules and the input terminals of the majority voter networks.

15. A fault tolerant clock comprising:
   a plurality of substantially identical modules, each module having an output terminal and comprising:
   an oscillator having an amplifier with an input terminal, an output terminal and a feedback path, the feedback path comprising:
   a majority voter network having a plurality of input terminals coupled to the output terminals of the modules respectively, and an output terminal,
   a variable trimming capacitor connected between the input terminal of said amplifier and a reference potential level, and
   a resonator connected between the output terminal of said majority voter network and the input terminal of said amplifier, the resonator comprising:
      a piezoelectric crystal having a resonant frequency, and
      first and second electrodes connected to the crystal, the first electrode being connected to the input terminal of the amplifier and the second electrode being coupled to the output terminal of the majority voter network, and
      the feedback path further comprising frequency selective means connected between said second electrode and a reference potential level for preventing oscillation at the resonant frequency of the crystal and allowing oscillation at an overtone of said resonant frequency.

16. A fault tolerant clock as recited in claim 15, wherein said isolation buffer comprises a plurality of logic gates which isolate each input terminal of each majority voter network from the input terminals in all of the majority voter networks.

* * * * *

UNITED STATES PATENT AND TRADEMARK OFFICE
CERTIFICATE OF CORRECTION

PATENT NO. : 4,984,241

DATED : January 8, 1991

INVENTOR(S) : Tuong K. Truong

It is certified that error appears in the above-identified patent and that said Letters Patent is hereby corrected as shown below:

Title Page, ABSTRACT, line 2, "n + 1" should be (item 57) --2n + 1--.

Signed and Sealed this

Twenty-first Day of December, 1993

Attest:

BRUCE LEHMAN

*Attesting Officer*     *Commissioner of Patents and Trademarks*